US005699665A

United States Patent [19]

Coolidge

[11] Patent Number: 5,699,665

[45] Date of Patent: Dec. 23, 1997

[54] CONTROL SYSTEM WITH INDUCED LOAD ISOLATION AND RELIEF

[75] Inventor: Gregory T. Coolidge, Fort Wayne, Ind.

[73] Assignee: Commercial Intertech Corp., Youngstown, Ohio

[21] Appl. No.: 630,493

[22] Filed: Apr. 10, 1996

[51] Int. Cl.[6] .................................................. F16D 31/02

[52] U.S. Cl. .................................. 60/426; 60/452; 91/447

[58] Field of Search ............................ 60/426, 450, 452; 91/447

[56] References Cited

U.S. PATENT DOCUMENTS

| | | | |
|---|---|---|---|
| 3,827,453 | 8/1974 | Mallot et al. | 137/117 |
| 4,617,854 | 10/1986 | Kropp | 91/517 |
| 4,719,753 | 1/1988 | Kropp | 60/445 |
| 5,067,389 | 11/1991 | St. Germain | 91/446 |
| 5,077,972 | 1/1992 | Bianchetta et al. | 60/427 |
| 5,138,837 | 8/1992 | Obertrifter et al. | 60/426 |
| 5,182,909 | 2/1993 | Stellwagen | 60/426 |
| 5,188,147 | 2/1993 | Shirai et al. | 137/596 |
| 5,237,908 | 8/1993 | Kropp | 91/518 |
| 5,243,820 | 9/1993 | Shimoura et al. | 60/452 |
| 5,259,192 | 11/1993 | Karakama et al. | 60/426 |
| 5,271,227 | 12/1993 | Akiyama et al. | 91/447 |
| 5,315,828 | 5/1994 | Stellwagen et al. | 60/426 |
| 5,333,450 | 8/1994 | Blendinger et al. | 60/459 |

FOREIGN PATENT DOCUMENTS

| | | | |
|---|---|---|---|
| 56-18102 | 2/1981 | Japan . | |
| 1 447 551 | 11/1973 | United Kingdom | F15B 13/06 |

OTHER PUBLICATIONS

Linde Hydraulik *Techn. Description*, Issue 1987, entitled "Linde-Synchron-Control-System".

SAE, The Engineering Society For Advancing Mobility Land Sea Air And Space *SAE Technical Paper Series* entitled "The Synchro Control System For Mobile Applications" by Herbert Seelman, Sep. 11–14, 1989.

*Primary Examiner*—F. Daniel Lopez

*Attorney, Agent, or Firm*—Renner, Kenner, Greive, Bobak, Taylor & Weber

[57] ABSTRACT

A pressure-responsive hydraulic control system (10) has a load-sensing flow-compensated pump (S) connected to a plurality of work sections; with a direction control valve (26, 26') and a pressure compensator valve in each work section; and with a flow-regulated logic check system (45); a flow-metered logic check system (40); an isolation circuit (60, 160, 260); and an induced load check system (70). Each pressure compensator valve is supplied flow-metered fluid from the respective direction control valve and supplies flow-regulated fluid to a hydraulic motor. The flow-regulated logic check system (45) provides a flow-regulated maximum output signal, and the flow-metered logic check system (40) provides a flow-metered maximum output signal. The isolation circuit (60, 160, 260) has an isolation valve (61, 161, 261) and a relief valve (67, 167, 267), receives the flow-regulated maximum output signal and flow-metered maximum output signal, supplies a load signal to the pump and supplies an isolation outlet signal to the induced load check system (70). The induced load check system compares the isolation outlet signal to the flow-regulated fluid signal for the respective work section and supplies the higher to the pressure compensator valve for that work section, whereby the pressure compensating valves and the relief valve are isolated from induced loads introduced in the flow-regulated maximum output signal by loads on the hydraulic motors. In lieu of an isolation circuit, a relief circuit (360) may be provided for certain applications.

20 Claims, 5 Drawing Sheets

CONTROL SYSTEM WITH INDUCED LOAD ISOLATION AND RELIEF

TECHNICAL FIELD

The present invention relates generally to a control system for simultaneously controlling a plurality of hydraulic loads. More particularly, the present invention relates to an integral control valve for simultaneously controlling a plurality of independent hydraulic loads. More specifically, the present invention relates to a control system for simultaneously controlling a plurality of loads which includes an isolation section which isolates induced load pressures that exceed the pressure capacity which can be developed by the system pump for reflecting control and/or relief functions of the system.

BACKGROUND ART

Load-sensing hydraulic control systems for multiple loads of the load-independent, proportional-flow type commonly have pressure compensating valves located downstream of metering orifices in the direction control valves for the loads. The load pressure signals may be sensed either downstream of the direction control valves or, perhaps more commonly, downstream of the pressure compensating valves. A load pressure signal circuit normally connects the highest of the load pressure signals to the spring chambers of the pressure compensating valve for each of the loads. Those conventional systems have proven to be generally effective in applications where load characteristics of the work sections are consistently maintained within the operating range of the system pump and minor extents of hydraulic motor fluctuations can be tolerated.

However, in many applications for such hydraulic control systems, load drift or sinking may be unacceptable. In addition, some systems have operating parameters in which one or more work sections of a control system may intermittently be subjected to loads of a high magnitude. When a load at any one hydraulic motor of a work section is greater than the highest pressure which can be developed by the system pump, an induced load is introduced into the load pressure signal circuit. The introduction of such an induced load as the highest load pressure sign in conventional control systems acts on and shuts the pressure compensating valves in all work sections as the highest load pressure signal, such that no work sections output flow irrespective of demand. Further, an induced load acting on a load sense relief valve can result in the induced load drifting uncontrollably.

Various proposals have been made in recent years to counteract drift and induced loads in control systems which may be subject to loading conditions tending to produce these phenomena. One approach has been the use of a comparator which monitors a desired pressure for the control valve with present load pressure to develop a pressure differential that can be used to readjust the control valve or a pressure compensating valve with respect to the direction of flow of working fluid to the hydraulic motors. Another approach has been to combine the pressure compensating valve with a load check valve, such that the common pressure signal directed to all the pressure compensating valves of the system is limited to a predetermined maximum level. In other instances, use of the highest indirect pressure to a pressure reducing valve to control the pump controller as well as the pressure compensating valves has been employed to prevent sinking. Another approach contemplates a load pressure duplicating valve which reduces pump output pressure to a pressure level equal to the load pressure which is used as the control fluid for the pressure compensating valves and the controller for the pump. Another example contemplates the use of additional spools in the direction control valve with associated switching spools, whereby different spools effect control under different operating conditions.

These various control systems are frequently adaptable to only a very specific direction control valve and/or pump arrangement and characteristics. In other instances, a solution for sinking or induced loads may adversely affect other aspects of the operation or performance of a control system. Where more spools or a substantial number of additional components are required for a particular control system, inordinate expense may be encountered. As a result of these various factors, no single control system has been widely adopted in the industry. cl DISCLOSURE OF THE INVENTION Therefore, an object of the present invention is to provide a load-sensing control system that maintains all the operating advantages of such systems which employ load-generated pressure to control pump displacement and to effect some pressure compensating. Another object of the invention is to provide such a control system having load-independent valve control. A further object of the invention is to provide such a control system which is capable of individually or simultaneously operatively servicing a plurality of work sections having hydraulic motors subjected to loading conditions varying in direction and magnitude.

Another object of the present invention is to provide a load-sensing control system wherein the pressure signal sent to the pump controller is a metered pressure signal derived from the pressure downstream of the direction control valve metering notches and upstream of the compensators. A further object of the invention is to provide such a control system wherein the metered pressure signal sent to the pump controller is the maximum metered pressure signal extant in any work section of the system at any point in time, thereby improving compensatory efficiency by accounting for flow velocity variations in the various direction control valves. Yet another object of the invention is to provide such a control system wherein the maximum metered pressure signal sent to the pump controller provides direction control valve response to build pressure to move a load at an improved rate because the pressure compensator valves do not need to be open to send a signals to the pump controller, thereby tending to preclude drifting of a load upon application to a hydraulic motor. Yet a further object of the invention is to provide such a controller wherein the maximum metered pressure signal sent to the pump controller permits utilization of pumps and controllers therefor having a low standby pressure in that the pump is not required to open the work section pressure compensator valves in order to send a signal back to the pump controller.

Another object of the present invention is to provide a load-sensing control system having an isolation circuit which precludes induced loads from acting on and closing the pressure compensator valves and thereby stopping flow from all of the work sections. Still another object of the invention is to provide such a load-sensing control system having an isolation circuit which precludes induced loads from acting on the load sense relief valve. Still a further object of the invention is to provide such a load-sensing control system having an isolation circuit which maintains flow to work sections having less than maximum load when the load sense relief valve limits pressure. Another object of the invention is to provide such a load-sensing control system having a relief section which maintains flow to work sections having less than maximum load when the load sense relief valve limits pressure in the absence of an isolation valve.

Another object of the present invention is to provide a load-sensing control system wherein the pump supplies one or more direction control valves with branch inlet fines having adjustable flow-limiting valves for selectively restricting flow to the inlet sections of the direction control valve and thus through motor conduits to the two chambers of a hydraulic motor to tailor fluid flow to the operating characteristics of a particular system. Still another object of the invention is to provide such a load-sensing control system wherein the work sections and a variety of isolation and/or relief circuits can be configured and interconnected in a manner which permits modular design for flexibility in satisfying a wide variety of system load parameters. A still further object of the invention is to provide such a load-sensing control system which may employ relatively simple, conventional hardware, such that construction and maintenance may be carded out at attractive costs.

In general, the present invention contemplates a pressure-responsive hydraulic control system having a plurality of work sections, a load-sensing flow-compensated source which creates a margin pressure connected by a parallel flow inlet conduit to the work sections and having a source return line, a hydraulic motor in each of the work sections operatively connected to a load, a direction control valve in each of the work sections connected to the inlet conduit and to the hydraulic motor, metering notches in the direction control valves controlling the flow of fluid from the source to the hydraulic motor, a pressure compensator valve in each of the work sections inputting flow-metered fluid from the metering notches and outputting flow-regulated fluid to the hydraulic motor, the pressure compensator valves having flow-metered pressure acting on one end thereof and a spring and a compensator control signal operating on the other end thereof, a flow-regulated logic check system interconnecting each of the work sections and providing a flow-regulated maximum output signal, a flow-metered logic check system interconnecting each of the work sections and providing a flow-metered maximum output signal, and an isolation circuit having an isolation valve and a relief valve and receiving the flow-regulated maximum output signal and the flow-metered maximum output signal and supplying a load signal to the source return line and an isolation outlet signal to an induced load check system also receiving a flow-regulated fluid signal from each of the work sections and supplying as the compensator control signal to each of the work sections the highest pressure signal of the isolation outlet signal and the flow-regulated fluid signal for the work section, whereby the pressure compensating valves and the relief valve are isolated from induced loads introduced in the flow-regulated maximum output signal by the load on the hydraulic motor of at least one of the work sections.

Another aspect of the present invention contemplates a pressure-responsive hydraulic control system having a plurality of work sections, a load-sensing flow-compensated source which creates a margin pressure connected by a parallel flow inlet conduit to the work sections and having a source return line, a hydraulic motor in each of the work sections operatively connected to a load, a direction control valve in each of the work sections connected to the inlet conduit and to the hydraulic motor, metering notches in the direction control valves controlling the flow of fluid from the source to the hydraulic motor, a pressure compensator valve in each of the work sections inputting flow-metered fluid from the metering notches and outputting flow-regulated fluid to the hydraulic motor, the pressure compensator valves having flow-metered pressure acting on one end thereof and a spring and a compensator control signal operating on the other end thereof, a flow-regulated logic check system interconnecting each of the work sections and providing a flow-regulated maximum output signal, a flow-metered logic check system interconnecting each of the work sections and providing a flow-metered maximum output signal, and a relief circuit having a relief valve and receiving the flow-regulated maximum output signal and the flow-metered maximum output signal and supplying a load signal to the source return line and a relief outlet signal to an induced load check system also receiving a flow-regulated fluid signal from each of the work sections and supplying as the compensator control signal to each of the work sections the highest pressure signal of the relief outlet signal and the flow-regulated fluid signal for the work section, whereby flow output is maintained at all of the work stations when the relief valve is limiting pressure.

PREFERRED EMBODIMENT FOR CARRYING OUT THE INVENTION

Figure 1:
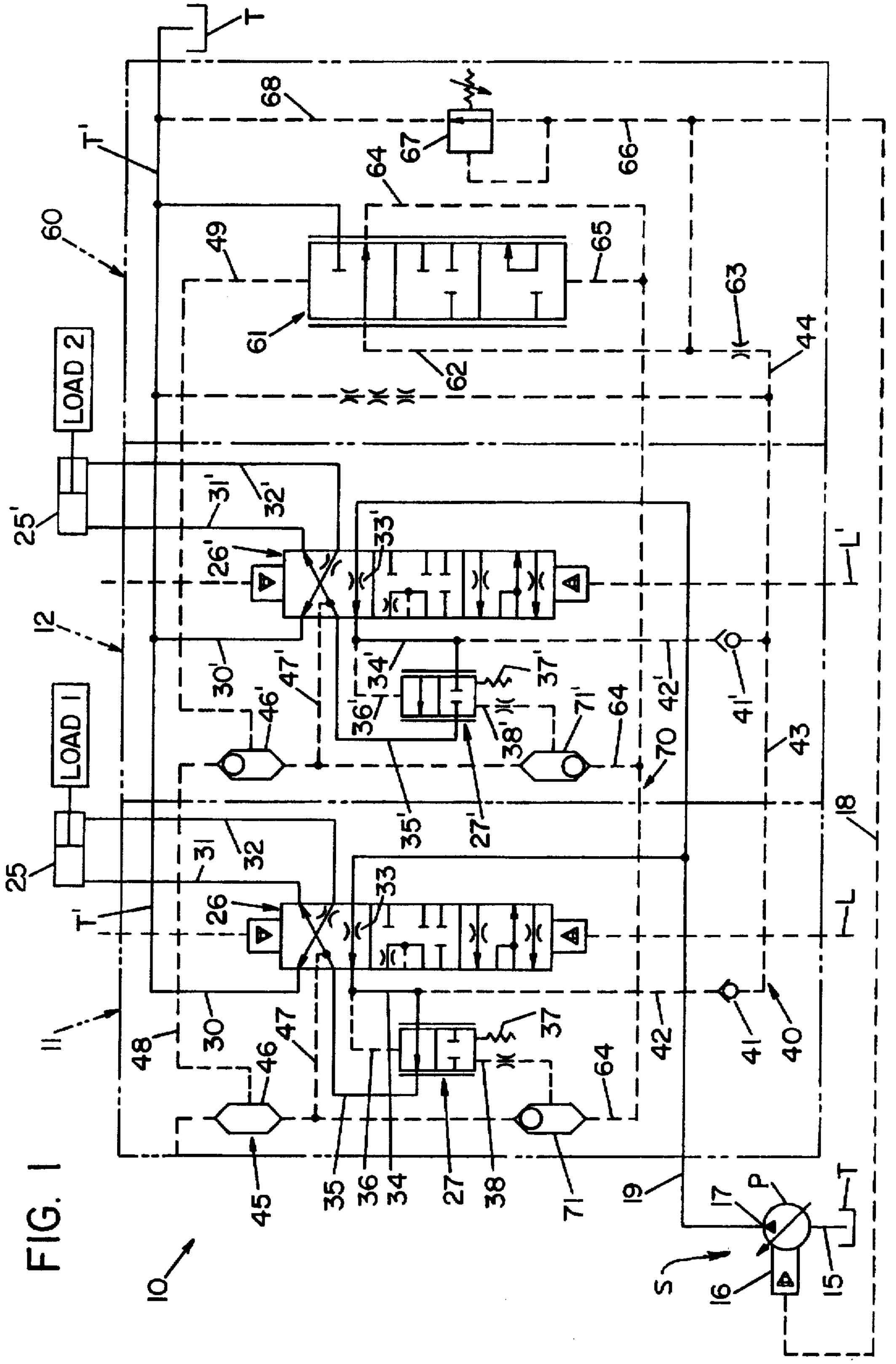
FIG. 1 is a schematic view of a control system according to the concepts of the present invention having a plurality of work sections with hydraulic motors serviced by a load-sensing flow-compensated source and tank and an operatively interrelated isolation circuit.

A control system embodying the concepts of the present invention is generally indicated by the numeral 10 in FIG. 1 of the drawings. The control system 10 shown is a pressure-responsive hydraulic arrangement adapted to independently control a plurality of hydraulic loads or users through a variety of operating conditions. Control system 10 includes a first work section, generally indicated by the numeral 11, and a second work section, generally indicated by the numeral 12. It is to be appreciated that additional work sections interconnected in the manner of work sections 11 and 12 may be provided, depending upon the number of loads or users involved in a particular application.

The work sections 11, 12 are interconnected with a load-sensing flow-compensated source which creates a margin pressure, generally indicated at S, and a tank T. As shown, pump P which operates as a load-sensing variable displacement pressure/flow compensated type which is connected to tank T by a pump input line 15. The pump P includes a controller 16 which maintains the output through discharge port 17 of pump P at a predetermined fixed pressure value, basically pump margin pressure, above the pressure in source return line 18. The output of port 17 of pump P is a parallel supply to the work sections 11, 12 through inlet conduit 19. As will be appreciated by persons skilled in the art, source S could be otherwise constituted for substantially the same operation. For example, source S could employ a fixed displacement type pump with an integral load sensing bypass type compensator or a fixed displacement pump used with a control system having an inlet section that has a load sensing bypass type compensator.

Only work section 11 is described in detail because work sections 11 and 12 are substantially identical. The corresponding elements of work section 12 are designated with identical numerals with a prime (').

The work section 11 includes a hydraulic motor, generally indicated by the numeral 25, which is operatively interrelated with a load designated Load 1, with a Load 2 operatively associated with hydraulic motor 25'. Work section 11 also includes a direction control valve, generally indicated by the numeral 26, and a compensator valve, generally indicated by the numeral 27. The direction control valve 26 is connected to the inlet conduit 19, to a tank line T' connected to tank T via a relief line 30, and to the double-acting hydraulic motor 25 through motor conduits 31 and 32. Fluid is supplied through motor conduit 31 to one chamber of hydraulic motor 25 and returned from the other chamber of hydraulic motor 25 via motor conduit 32 or vice versa, depending upon the positioning of direction control valve 26 which may be effected by a mechanical linkage L in a manner well known in the art. The direction control valve 26 has infinitely adjustable metering notches 33 through which fluid from inlet conduit 19 is directed. The output of notches 33 is downstream to the inlet of compensator valve 27 through a flow-metered conduit 34.

The outlet of compensator valve 27 is through a flow-regulated conduit 35 which returns to direction control valve 26 and selectively interconnects with a motor conduit 31 or 32. One end of compensator valve 27 is acted upon by a flow-metered pilot line 36 which is connected to flow-metered conduit 34. The other end of compensator valve 27 is acted upon by a spring 37 and a compensator control pilot line 38 having a pressure signal derived in a manner hereinafter described.

Interconnecting the work sections 11 and 12 is a flow-metered logic check system, generally indicated by the numeral 40. The flow-metered logic check system 40 consists of a pair of check valves 41 and 41' which are associated with work sections 11 and 12, respectively. Flow-metered logic input lines 42 and 42', which are connected to flow-metered conduits 34 and 34', respectively, operate on one side of the check valves 41 and 41', respectively. A flow-metered logic transfer line 43 interconnects the other side of check valves 41 and 41'. It will be appreciated by persons skilled in the an that due to the arrangement of flow-metered logic check system 40, the flow-metered logic transfer line 43 will reflect the pressure of the flow-metered logic input line 42 or 42' having the highest or maximum pressure. The flow-metered logic check system 40 has a flow-metered maximum output line 44 connected to flow-metered logic transfer line 43 which directly or indirectly communicates with the source return line 18. Thus, the flow-metered logic check system 40 normally improves compensator efficiency by employing the highest pressure in any of a plurality of work sections 11, 12, which may vary to some extent due to flow velocity variations in the direction control valves 26, 26' or the like.

The work sections 11 and 12 are also interconnected by a flow-regulated logic check system, generally indicted by the numeral 45. The flow-regulated logic check system consists of a pair of check valves 46 and 46' which are associated with work sections 11 and 12, respectively. Flow-regulated logic input lines 47 and 47' which are connected to flow-regulated conduits 35 and 35', respectively, operate on one side of the check valves 46 and 46', respectively. A flow-regulated logic transfer line 48 interconnects the other side of check valves 46 and 46'. In a manner comparable to flow-metered logic check system 40, the flow-regulated logic transfer line 48 will reflect the pressure of flow-regulated logic input line 47 or 47' having the highest or maximum pressure, which also constitutes a representation of the highest load pressure signal at any point in time. The flow-regulated logic check system 45 has a flow-regulated maximum output line 49 which communicates with each of the compensator control pilot lines 38 and 38' at the ends of compensator valves 27 and 27' having the springs 37 and 37'.

The control system 10 is provided with an isolation circuit, generally indicted by the numeral 60. The isolation circuit 60 includes an isolation spool valve 61 that has an isolation spool input conduit 62 which is connected to flowmetered maximum output line 44 through a flow-limiting orifice 63 having a maximum pressure differential across it that does not exceed the pump margin pressure. Isolation spool valve 61 has an isolation spool outlet conduit 64 which communicates with compensator valves 27, 27' in a manner described hereinafter.

One end of isolation spool valve 61 senses the pressure in flow-regulated maximum output line 49 of flow-regulated logic check system 45. The other end of isolation spool valve 61 senses the output of isolation spool valve 61 via a passage 65 connected to isolation spool outlet conduit 64. The isolation spool input conduit 62 is connected downstream of flow-limiting orifice 63 with a relief valve input conduit 66 connected to a load signal relief valve 67, which may be a pressure-adjustable spring-loaded poppet valve. The relief valve 67 has an output conduit 68 which is selectively connected to tank line T' for relieving pressures in isolation spool inlet conduit 62 exceeding a preset value. Isolation spool inlet conduit 62 is also connected downstream of flow-limiting orifice 63 to the source return line 18.

The isolation circuit 60 communicates via isolation spool outlet conduit 64 an outlet signal to an induced load check system 70 which is operatively interrelated with each of the work sections 11, 12. In particular, induced load check valves 71 and 71' are associated with the work sections 11 and 12, respectively, and operatively interrelate with the compensator valves 27 and 27'. Specifically, the isolation spool outlet conduit 64 operates on one side of each of the induced load check valves 71 and 71'. The flow-regulated conduits 35 and 35' of work sections 11 and 12 are connected to the other side of the check valves 71 and 71'. The output of the check valves 71 and 71' are the compensator control pilot lines 38 and 38' which operate on the ends of the compensator valves 27 and 27' having the springs 37 and 37'. In each instance, the compensator control pilot lines 38 and 38' at any time carry the maximum pressure as between isolation spool outlet conduit 64 and respective flow-regulated conduits 35 and 35'.

Under normal operating conditions, the control system 10 performs in a manner similar to some load-sensing hydraulic systems which use load-generated pressure to control pump displacement and to effect some pressure compensating. In addition, there is provided load-independent, proportional flow control having the compensator valves 27, 27' located downstream of the metering notches 33, 33' in the direction control valves 26, 26' of the exemplary work sections 11, 12. If the combined demand for fluid from the work circuits 11, 12 is greater than the maximum flow output which can be developed by the pump P, the compensator valves 27, 27' proportion the flow according to the relative size of the metering notches 33 and 33' operative in the direction of control valves 26, 26'. Either or both of the hydraulic motors 25, 25' can be actuated by an operator manipulation of the mechanical linkages L, L' to the direction control valves 26, 26'.

When both control valves 26, 26' are actuated to a temporarily fixed setting when relief valve 67 is not pressure limiting, the isolation spool valve 61 of isolation circuit 60 effects pressure reducing and achieves a balanced position in the top position depicted in FIG. 1. In the non-pressure limiting condition, control system 10 would differ from FIG. 1 in having relief valve 67 in the closed position, the ball of check valve 71' in the other position, and compensator valve 27' open to provide flow to hydraulic motor 25'. Under this circumstance, the pressure in the flow-regulated maximum output line 49 operating on isolation spool 61 is reproduced in isolation spool outlet conduit 64 which is supplied as hereinabove described through the induced load check system 70 to the spring end of both compensator valves 27 and 27', with the proper pressure differential being maintained across the compensator valves 27 and 27'. Further, the compensator valves 27, 27' function in the usual manner with controller 16 and pump P to maintain the desired pressure differentials across the metering notches 33 and 33' so that the required flow rates therethrough are achieved.

As the position of the control valves 26, 26' is varied, the isolation spool valve 61 moves to achieve force equilibrium. In so responding, the isolation spool valve 61 may move to the middle and lower positions depicted in FIG. 1 where it performs pressure reducing and/or relieving. In this respect, the input of isolation spool input conduit 62 reflecting pressure in flow-metered maximum output line 44 is pressure reduced to adjust pressure in isolation spool outlet conduit 64 and relieves outlet pressure to spool outlet conduit 64 to tank line T', if the pressure is too high.

The isolation spool valve 61 also has significant functions in the event of an induced load. For purposes of discussion herein, an induced load is a load pressure acting on any one hydraulic motor 25 or 25' which is greater than the highest pressure which can be developed by the pump P. The output pressure of pump P is limited to the pressure setting of load signal relief valve 67 plus the margin pressure of the pump P. Such an induced load pressure becomes the pressure in the flow-regulated maximum output line 49 as the output of flow-regulated logic check system 45. In the absence of isolation spool valve 61, this induced load pressure would act on the spring end of all of the compensator valves 27, 27'. The result would be that all the compensator valves 27, 27' would shut because the higher induced load pressure would operate on the area of the spring end thereof, whereas flow-metered conduit 34 pressure, which is essentially the lesser outlet pressure of pump P, operates on the other end which is of equal area.

The FIG. 1 depiction shows an induced load condition at hydraulic motor 25' which causes relief valve 67 to open and relieve to tank line T'. The compensator valve 27' is closed because the induced load at hydraulic motor 25' acts on it through check valve 71'. This is necessary to hold the induced load at hydraulic motor 25' stationary. Isolation spool 61 of isolation circuit 60 achieves an unbalanced condition in the top position depicted in FIG. 1. In this respect, the isolation spool outlet conduit 64 senses the pressure in isolation spool input conduit 62 which reflects pressure in relief valve input conduit 66. The lower end of isolation spool valve 61 senses the output of isolation spool valve 61 via outlet passage 65 connected to isolation spool conduit 64. The compensator valve 27 is acted upon by the lesser pressure in isolation spool outlet conduit 64. Compensator valve 27 is thus isolated from an induced load since the induced load pressure acts only on the upper end of isolation spool valve 61 which is of equal area. In order to resume operation of hydraulic motor 25', the induced load condition must be eliminated. This could be implemented by external means to control system 10 or possibly by manipulating hydraulic motor 25, if it is applying load to hydraulic motor 25'.

The isolation spool valve 61 also segregates the load sense relief valve 67 from the induced load pressure. In order to limit the output pressure of the pump P and maintain flow output in any work section 11 which is at less than induced load pressure, the pressure of flow-metered maximum output line 44 must be limited. This is effected by relief valve 67 acting thereon with the induced load pressure being separated therefrom by the isolation spool valve 61. Also, isolation spool valve 61 prevents an induced load from drifting because flow is displaced by relief valve 67.

When the relief valve 67 actuates to relieve pressure in isolation spool input conduit 62 from flow-metered maximum output line 44, the flow output in any work section 11, 12 having less than the maximum load will be less because the same signal is sent to the compensator valves 27, 27' and the pump controller 16, such that the pressure differential across the metering notches 33, 33' is reduced. The flow through compensator valves 27, 27' is also reduced because the margin pressure of pump P is consumed from the discharge port 17 of pump P downstream rather than upstream of the compensator valves. Such flow reduction is desirable in some applications.

Figure 2:
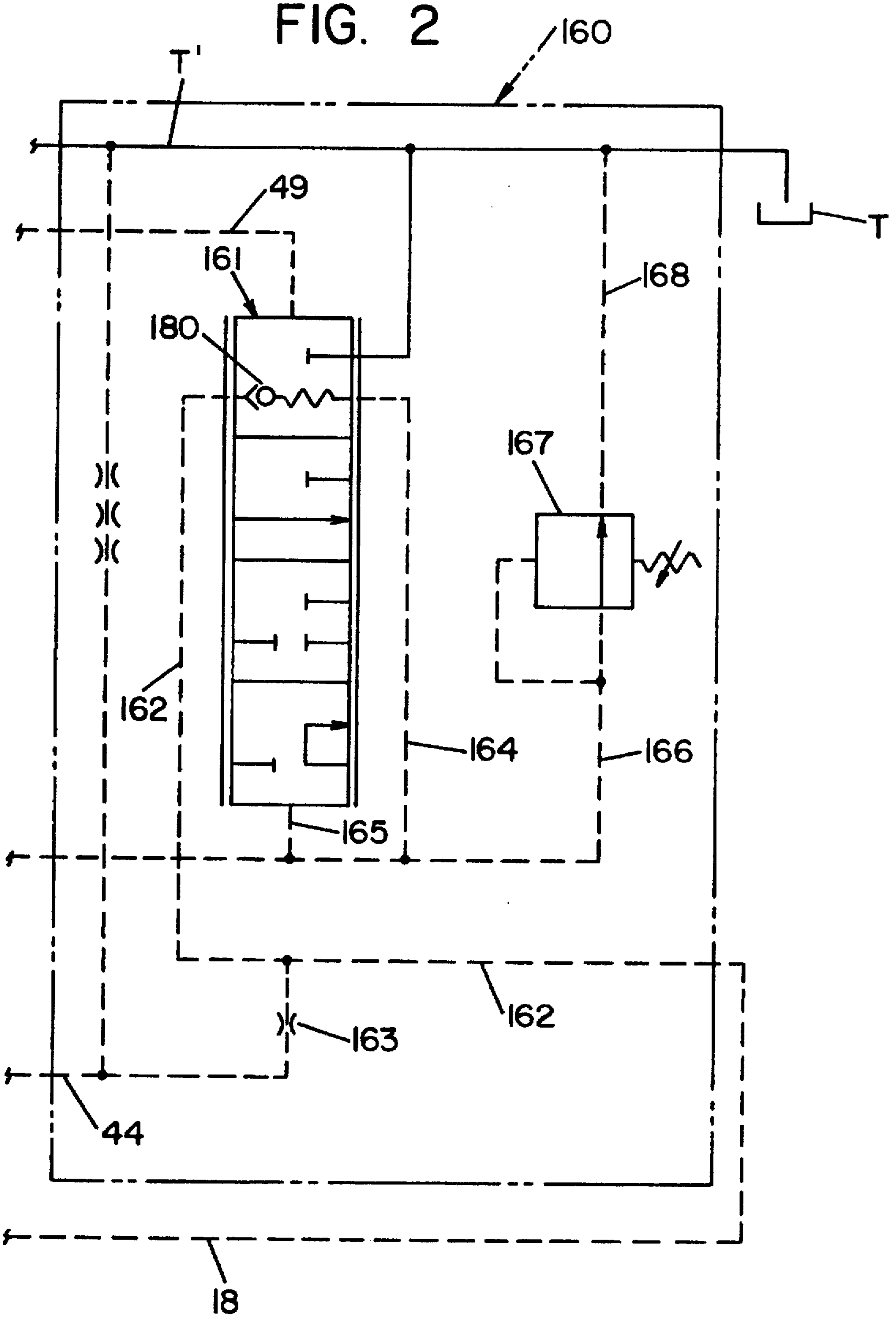
FIG. 2 is a fragmentary schematic view of the control system of FIG. 1 showing a modified form of isolation circuit according to the concepts of the present invention.

A modified form of isolation circuit for use with control system 10 is generally indicated by the numeral 160 in FIG. 2 of the drawings. The isolation circuit 160 includes an isolation spool valve 161 that has an isolation spool input conduit 162 which is connected to flow-metered maximum output line 44 through a flow-limiting orifice 163 having a maximum pressure differential across it that does not exceed the pump margin pressure. Isolation spool valve 161 has an isolation spool outlet conduit 164 which communicates with compensator valves 27, 27' of work sections 11, 12 via induced load check system 70.

One end of isolation spool valve 161 senses the pressure in flow-regulated maximum output line 49 of flow-regulated logic check system 45. The other end of isolation spool valve 161 senses the output of isolation spool valve 161 via a passage 165 connected to isolation spool outlet conduit 164. The isolation spool outlet conduit 164 is also connected with a relief valve input conduit 166 connected to a load signal relief valve 167. The relief valve 167 has an output conduit 168 which is selectively connected to tank line T' for relieving pressures in isolation spool outlet conduit 164 exceeding a preset value. Isolation spool inlet conduit 162 is connected downstream of flow-limiting orifice 163 to source return line 18. The isolation spool valve 161 is similar to isolation spool valve 61 except for the presence of a spring-loaded isolation check valve 180, which is incorporated in the isolation spool valve 161, and the addition of a fourth distinct position of isolation spool 161.

The operation of control system 10 with isolation circuit 160 is essentially identical to the operation described above in relation to isolation circuit 60. The primary exception is that in operation when the relief valve 167 actuates to relieve pressure in spool outlet conduit 164, the pressure in isolation spool input conduit 162 reflecting the pressure of flow-metered maximum output line 44 is limited by the isolator spool check valve 180 because of the pressure drop occasioned by the spring pressure with isolation spool valve 161 in the FIG. 2 position. The isolation check valve 180, therefore, maintains the proper pressure differential between isolation spool input conduit 162 and isolation spool outlet conduit 164 to the compensators 27, 27'. It will thus be observed that when the relief valve 167 limits pressure, the flow output in any work section 11, 12 having less than the maximum load will be maintained in contrast to the previously described operation of isolation circuit 60.

Figure 3:
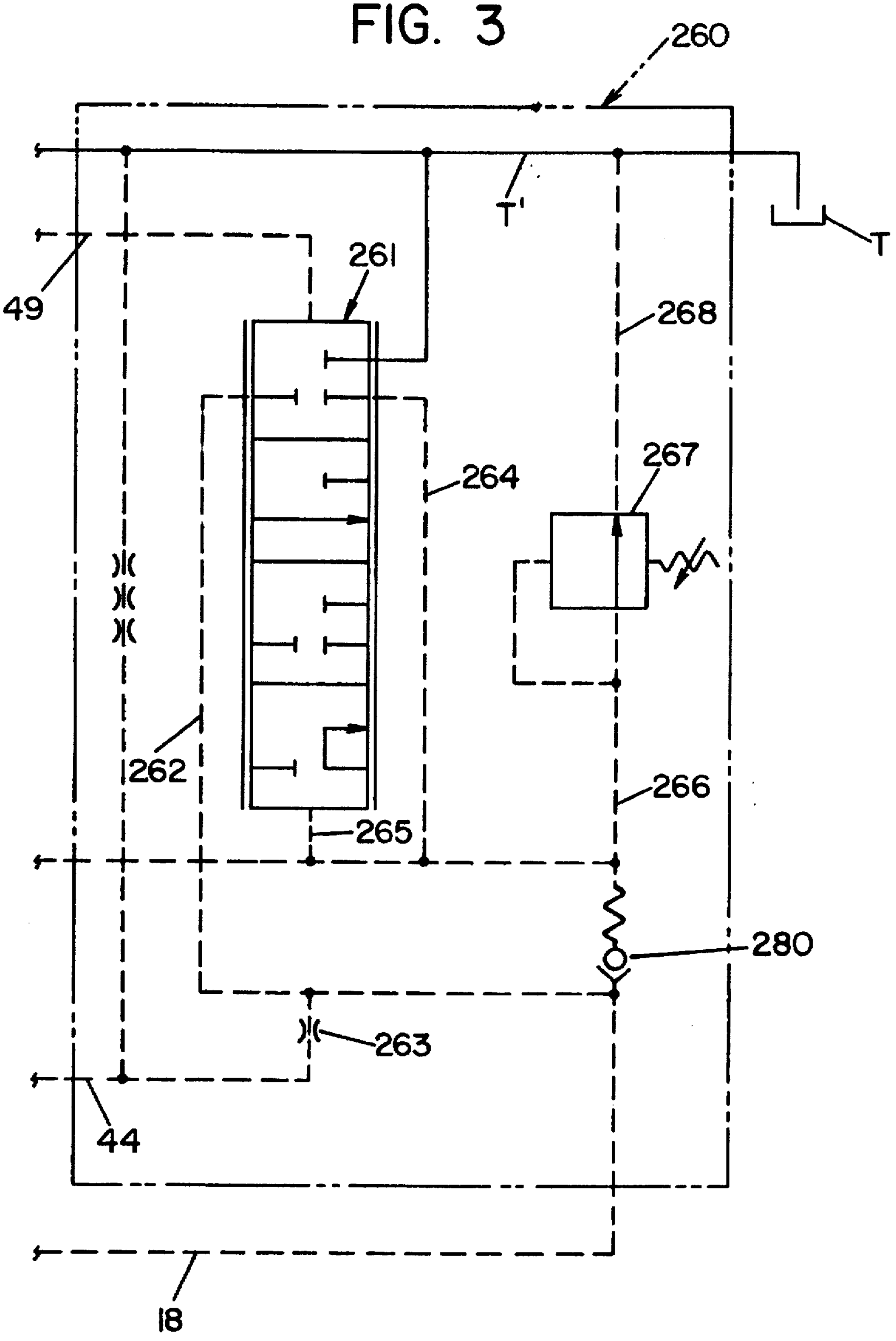
FIG. 3 is a fragmentary schematic view of the control system of FIG. 1 showing a modified form of isolation circuit similar to FIG. 2 and according to the concepts of the present invention.

A modified form of isolation circuit for use with control system 10 and similar to FIG. 2 is generally indicated by the numeral 260 in FIG. 3 of the drawings. The isolation circuit 260 includes an isolation spool valve 261 that has an isolation spool input conduit 262 which is connected to flow-metered maximum output line 44 through a flow-limiting orifice 263 having a maximum pressure differential across it that does not exceed the pump margin pressure. Isolation spool valve 261 has an isolation spool outlet conduit 264 which communicates with compensator valves 27, 27' of work sections 11, 12 via induced load check system 70.

One end of isolation spool valve 261 senses the pressure in flow-regulated maximum output line 49 of flow-regulated logic check system 45. The other end of isolation spool valve 261 senses the output of isolation spool valve 261 via a passage 265 connected to isolation spool outlet conduit 264. The isolation spool outlet conduit 264 is also connected with a relief valve input conduit 266 connected to a load signal relief valve 267. The relief valve 267 has an output conduit 268 which is selectively connected to tank line T' for relieving pressures in isolation spool outlet conduit 264 exceeding a preset value. Isolation spool inlet conduit 262 is connected downstream of flow-limiting orifice 263 to source return line 18.

The isolation spool valve 261 is identical to isolation spool valve 161 except there is no spring-loaded isolation check valve 180. Rather, a spring-loaded check valve 280 is interposed between the isolation spool outlet conduit 264 upstream of the relief valve 267 and the isolation spool inlet conduit 262.

The operation of control system 10 with isolation circuit 260 is essentially identical to the operation described above in relation to isolation circuit 160. The main differences are that segregating check valve 280 from the spool of isolation spool valve 261 provides a simplified mechanical and machining arrangement. However, incorporating check valve 180 in isolation spool valve 161 pursuant to FIG. 2 lends the possibility of greater efficiency in the pressure reducing and/or relieving positions because the check valve 180 may be located so its connections are blocked by movement of the spool, resulting in less leakage across the check valve 161.

Figure 4:
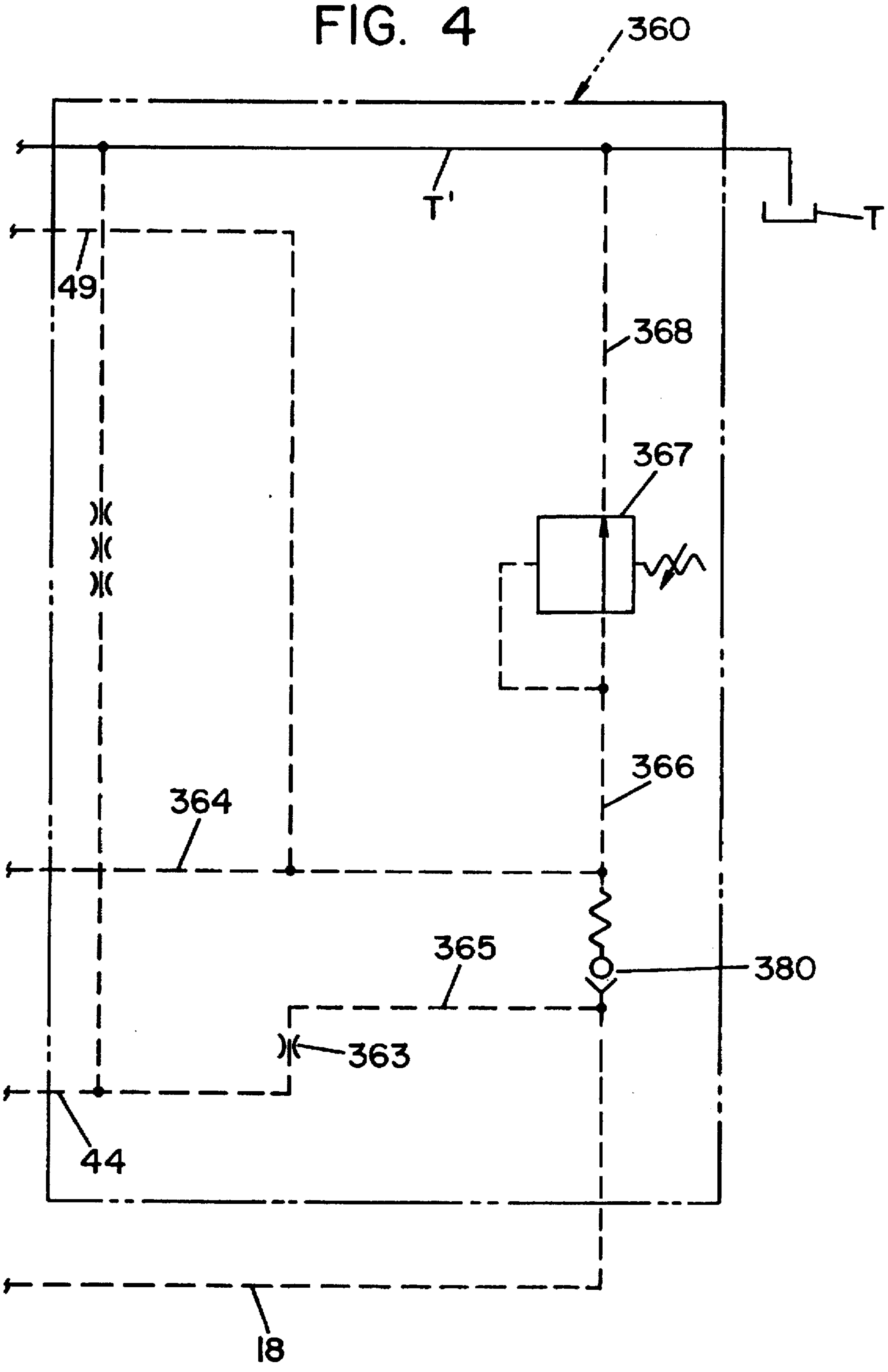
FIG. 4 is a fragmentary schematic view of the control system of FIG. 1 showing an exemplary relief circuit according to the concepts of the present invention.

In operating circumstances where induced loads are a rare or nonexistent occurrence, a relief circuit, generally indicated by the numeral 360 in FIG. 4 of the drawings, may be employed with control system 10 in lieu of isolation circuits 60, 160, or 260. The relief circuit 360 is essentially the modified isolation circuit of FIG. 3 without the isolation spool valve 261. As seen in FIG. 4, the flow-metered maximum output line 44 is directed through a flow-limiting orifice 363 having a maximum pressure differential across it that does not exceed the pump margin pressure. Downstream of flow-limiting orifice 363, the load signal output line 365 connects to source return line 18.

The flow-regulated maximum output line 49 of flow-regulated logic check system 45 connects directly with a compensator output line 364 which communicates with compensator valves 27, 27' of work sections 11, 12 via induced load check system 70 and with a load signal relief valve 367 via relief valve input conduit 366. The relief valve 367 has an output conduit 368 which is selectively connected to tank line T' for relieving pressures in compensator output line 364 exceeding a preset value. A spring-loaded check valve 380 is interposed between the compensator output line 364 upstream of the relief valve 367 and the load signal output line 365 for limiting pressure in load signal output fine 365.

It will be appreciated that operation of control system 10 with relief circuit 360 provided no protection to compensator valves 27, 27' or relief valve 367 from induced loads introduced through flow-regulated maximum output line 49 and the attendant disadvantages described hereinabove. However, the check valve 380 maintains the proper pressure differential between load signal output line 365 and compensator output line 364 to compensators 27, 27'. Thus, flow output in any work section 11, 12 having less than maximum load will be maintained when relief valve 367 limits pressure.

Figure 5:
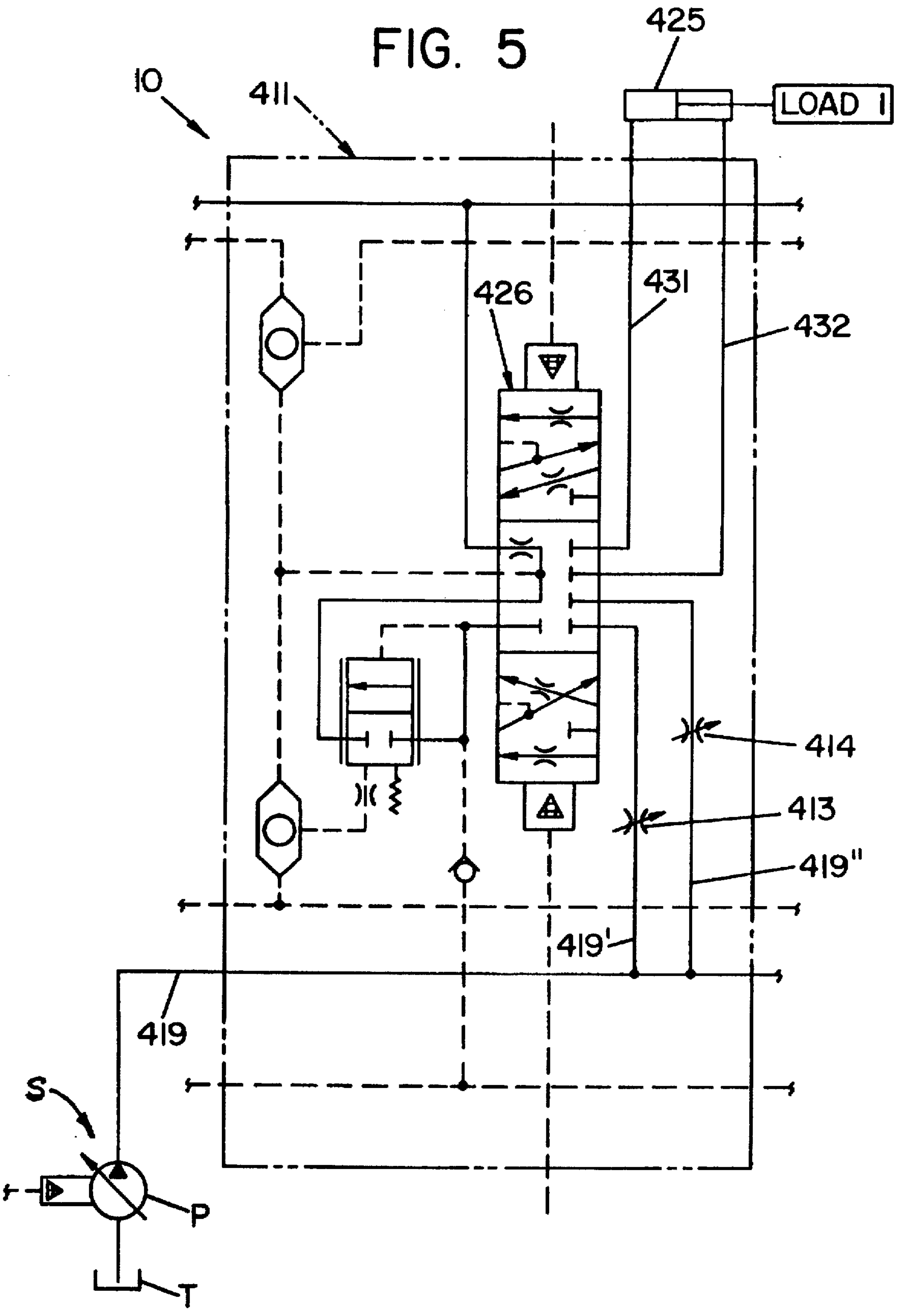
FIG. 5 is a fragmentary schematic view of the control system of FIG. 1 showing an alternative form of work section with branch inlet lines having adjustable flow control valves serving the direction control valve according to the concepts of the present invention.

An alternate work section, generally indicated by the numeral 411, is shown in conjunction with the control system 10 in FIG. 5 of the drawings. The work section 411 is essentially identical to work section 11 described above, except that inlet conduit 419 has branch inlet lines 419'and 419" interconnecting the source S with the direction control valve, generally indicated by the numeral 426. The branch inlet lines 419' and 419" have adjustable flow-limiting valves 413 and 414 which restrict flow to the inlet sections of direction control valve 426 and thus through motor conduits 431 and 432 to the respective chambers of the double-acting hydraulic motor 425. With this arrangement, flow quantity may be adjusted as desired to take into account maximum pressure requirements and other operating characteristics of a particular Load 1 serviced by hydraulic motor 425. It will be appreciated by persons skilled in the art that the adjustable flow-limitation valves 413, 414 may be physically located in the branch inlet lines 419', 419" or incorporated into the direction control valve 426. Further, flow-limitation valves 413 and 414 may be employed in only one or any number of work sections 11, 12 in a control system 10.

Thus, it should be evident that the subject control system carries out the various objects of the invention set forth hereinabove and otherwise constitutes an advantageous contribution to the art. As may be apparent to persons skilled in the art, modifications can be made to the preferred embodiments disclosed herein without departing from the spirit of the invention, the scope of the invention being limited solely by the scope of the attached claims.

I claim:

1. A pressure-responsive hydraulic control system comprising, a plurality of work sections, a load-sensing flow-compensated source which creates a margin pressure connected by a parallel flow inlet conduit to said work sections and having a source return line, a hydraulic motor in each of said work sections operatively connected to a load, a direction control valve in each of said work sections connected to said inlet conduit and to said hydraulic motor, metering notches in said direction control valves controlling the flow of fluid from said source to said hydraulic motor, a pressure compensator valve in each of said work sections inputting flow-metered fluid from said metering notches and outputting flow-regulated fluid to said hydraulic motor, said pressure compensator valves having flow-metered pressure acting on one end thereof and a spring and a compensator control signal operating on the other end thereof, a flow-regulated logic check system interconnecting each of said work sections and providing a flow-regulated maximum output signal, a flow-metered logic check system interconnecting each of said work sections and providing a flow-metered maximum output signal, and an isolation circuit having an isolation valve and a relief valve and receiving said flow-regulated maximum output signal and said flow-metered maximum output signal and supplying a load signal to said source return line and supplying an isolation outlet signal to an induced load check system which also receives a flow-regulated fluid signal from each of said work sections and supplying as said compensator control signal to each of said work sections the highest pressure signal of said isolation outlet signal and the flow-regulated fluid signal for said work section, whereby said pressure compensating valves and said relief valve are isolated from induced loads introduced in said flow-regulated maximum output signal by said load on said hydraulic motor of at least one of said work sections.

2. A control system according to claim 1, wherein said isolation valve includes an isolation spool balanced by said flow-regulated maximum output signal acting on one end thereof and said isolation output signal acting on the other end thereof, said spool input receiving said flow-metered maximum output signal and effecting reducing and relieving functions to produce said isolation output signal.

3. A control system according to claim 2, wherein said flow-metered maximum output signal is operated on by a flow-limiting orifice interposed between said flow-metered logic check system and said isolation valve.

4. A control system according to claim 3, wherein said relief valve operates on said flow-metered maximum output signal downstream of said flow-limiting orifice and upstream of said isolation valve, said isolation spool being in an unbalanced position whereby said isolation outlet signal is connected to said isolation spool input and disconnected from tank relief conduits when said relief valve is limiting pressure.

5. A control system according to claim 4, wherein said relief valve is adjustable to relieve pressure at any desired preset value.

6. A control system according to claim 2, wherein said one end and said other end of isolation spool are of equal area.

7. A control system according to claim 1, wherein said isolation valve includes an isolation spool balanced by said flow-regulated maximum output signal acting on one end thereof and said isolation outlet signal acting on the other end thereof, said isolation spool input receiving said flow-metered maximum output signal and effecting reducing and relieving functions to produce said isolation outlet signal, and an isolation check valve in said isolation spool operative for maintaining a fixed pressure differential between said isolation spool input and said isolation outlet signal to maintain flow output at all of said work sections, said isolation spool being in an unbalanced position whereby said isolation outlet signal is disconnected from said isolation spool input when said relief valve is limiting pressure.

8. A control system according to claim 7, wherein said isolation check valve is spring loaded.

9. A control system according to claim 7, wherein said relief valve operates on said isolation outlet signal downstream of said isolation spool.

10. A control system according to claim 1, wherein said isolation valve includes an isolation spool balanced by said flow-regulated maximum output signal acting on one end thereof and said isolation outlet signal acting on the other end thereof, said isolation spool input receiving said flow-metered maximum output signal and effecting reducing and relieving functions to produce said isolation output signal and an isolation check valve interposed between said isolation outlet signal upstream of said relief valve and said isolation spool input operative for maintaining a fixed pressure differential between said isolation spool input and said isolation output signal to maintain flow output at all of said work sections, said isolation spool being in an unbalanced position whereby said isolation outlet signal is disconnected from said isolation spool input when said relief valve is limiting pressure.

11. A control system according to claim 10, wherein said isolation check valve is spring loaded.

12. A control system according to claim 10, wherein said relief valve operates on said isolation outlet signal downstream of said isolation spool.

13. A control system according to claim 1, wherein said inlet conduit to at least one of said work stations has branch inlet lines with flow-limiting valves for restricting flow to the inlet sections of said direction control valve and thus through motor conduits connecting said metering notches in said direction control valve and said hydraulic motor.

14. A control system according to claim 13, wherein said flow-limiting valves are adjustable.

15. A pressure-responsive hydraulic control system comprising, a plurality of work sections, a load-sensing flow-compensated source which creates a margin pressure connected by a parallel flow inlet conduit to said work sections and having a source return line, a hydraulic motor in each of said work sections operatively connected to a load, a direction control valve in each of said work sections connected to said inlet conduit and to said hydraulic motor, metering notches in said direction control valves controlling the flow of fluid from said source to said hydraulic motor, a pressure compensator valve in each of said work sections inputting flow-metered fluid from said metering notches and outputting flow-regulated fluid to said hydraulic motor, said pressure compensator valves having flow-metered pressure acting on one end thereof and a spring and a compensator control signal operating on the other end thereof, a flow-regulated logic check system interconnecting each of said work sections and providing a flow-regulated maximum output signal, a flow-metered logic check system interconnecting each of said work sections and providing a flow-metered maximum output signal, and a relief circuit having a relief valve and receiving said flow-regulated maximum output signal and said flow-metered maximum output signal and supplying a load signal to said source return line and supplying a relief outlet signal to an induced load check system which also receives a flow-regulated fluid signal from each of said work sections and supplying as said compensator control signal to each of said work sections the highest pressure signal of said relief outlet signal and the flow-regulated fluid signal for said work section, whereby flow output is maintained at all of said work stations when said relief valve is limiting pressure.

16. A control system according to claim 15, wherein said flow-regulated maximum output signal connects with said relief outlet signal, said relief valve operates on said relief outlet signal, and a check valve operative for maintaining a fixed pressure differential between said load signal and said relief outlet signal to maintain flow output at all of said work sections when said relief valve is limiting pressure.

17. A control system according to claim 16, wherein said check valve is spring loaded.

18. A control system according to claim 16, wherein said relief valve is adjustable.

19. A control system according to claim 16, wherein said flow-metered maximum output signal is operated on by a flow-limiting orifice interposed between said flow-metered logic check system and said check valve.

20. A pressure-responsive hydraulic control system comprising, a plurality of work sections, a load-sensing flow-compensated source which creates a margin pressure connected by a parallel flow inlet conduit to said work sections and having a source return line, a hydraulic motor in each of said work sections operatively connected to a load, a direction control valve in each of said work sections connected to said inlet conduit and to said hydraulic motor, metering notches in said direction control valves controlling the flow of fluid from said source to said hydraulic motor, a pressure compensator valve in each of said work sections inputting flow-metered fluid from said metering notches and outputting flow-regulated fluid to said hydraulic motor, said pressure compensator valves having flow-metered pressure acting on one end thereof and a spring and a compensator control signal operating on the other end thereof, a flow-regulated logic check system interconnecting each of said work sections and providing a flow-regulated maximum output signal, a flow-metered logic check system interconnecting each of said work sections and providing a flow-metered maximum output signal, a source return line receiving said flow-metered maximum output signal, and an induced load check system receiving said flow-regulated maximum output signal and a flow-regulated fluid signal from each of said work sections and supplying as said compensator control signal to each of said work sections the highest pressure signal of said flow-regulated maximum output signal and the flow-regulated fluid signal for said work section.

* * * * *